United States Patent
Mela

(10) Patent No.: US 7,141,759 B2
(45) Date of Patent: Nov. 28, 2006

(54) GENERATOR FOR UNITARY POWER FACTOR ARC WELDERS

(75) Inventor: Franco Mela, Piazzola sul Brenta (IT)

(73) Assignee: Selco S.R.L., Onara di Tombolo (IT)

( * ) Notice: Subject to any disclaimer, the term of this patent is extended or adjusted under 35 U.S.C. 154(b) by 484 days.

(21) Appl. No.: 10/363,900

(22) PCT Filed: Jul. 10, 2002

(86) PCT No.: PCT/EP02/07710

§ 371 (c)(1),
(2), (4) Date: Mar. 10, 2003

(87) PCT Pub. No.: WO03/008141

PCT Pub. Date: Jan. 30, 2003

(65) Prior Publication Data

US 2004/0079739 A1    Apr. 29, 2004

(30) Foreign Application Priority Data

Jul. 19, 2001   (IT) .......................... PD2001A0182

(51) Int. Cl.
*B23K 9/10* (2006.01)
(52) U.S. Cl. ............................................... 219/130.21
(58) Field of Classification Search ............ 219/130.1, 219/130.21, 130.32, 130.33, 130.51
See application file for complete search history.

(56) References Cited

U.S. PATENT DOCUMENTS

| | | | |
|---|---|---|---|
| 4,769,754 A * | 9/1988 | Reynolds et al. ...... | 219/130.21 |
| 4,876,433 A | 10/1989 | Kashima et al. | |
| 5,712,771 A * | 1/1998 | Fitter et al. .................... | 363/17 |
| 5,783,799 A * | 7/1998 | Geissler ................ | 219/137 PS |
| 5,991,169 A | 11/1999 | Kooken | |
| 6,023,037 A | 2/2000 | Church et al. | |
| 6,091,612 A | 7/2000 | Blankenship | |
| 6,570,128 B1 * | 5/2003 | Mela ........................ | 219/130.1 |
| 6,593,546 B1 * | 7/2003 | Mela ........................ | 219/130.1 |

* cited by examiner

*Primary Examiner*—Clifford C. Shaw
(74) *Attorney, Agent, or Firm*—Modiano & Associati; Albert Josif; Daniel O'Byrne

(57) ABSTRACT

A generator for unitary power factor arc welders, comprising a current transformer that supplies, at a secondary winding thereof, a welding arc and is in turn supplied, at a primary winding thereof, by an input leveling and rectifying unit, between the rectifier unit and the transformer being interposed an electronic circuit with two electronic switches that provide a half-bridge structure that performs DC/DC conversion by way of the combination of the transformer and of a rectifier stage connected to the secondary winding of the transformer, and a leveling inductor, the circuit having the combination of resonant capacitive and inductive components arranged on the side of the primary winding of the transformer, the components charging the bank of capacitors arranged downstream of the electronic switches, furthermore keeping the voltage across it constant.

4 Claims, 6 Drawing Sheets

GENERATOR FOR UNITARY POWER FACTOR ARC WELDERS

TECHNICAL FIELD

The present invention relates to a generator for arc welders.

BACKGROUND ART

According to the prior art, a classic diagram of an arc welder with electronic control and power supply circuit is shown in FIG. 1.

This diagram provides a rectifier stage 1, followed by a bank of leveling capacitors 2 that supply a power transformer 4 by means of an inverter block 3 with high-frequency electronic switches.

The secondary winding of the transformer 4 is followed by a rectifier stage 5 and by an inductor 6 for leveling the output current, which is the current that circulates in a welding arc 7.

During operation, a welder with a diagram of this kind absorbs from the mains a current whose waveform has a shape of the kind shown in FIG. 2, which, as shown, has a high content of harmonics.

In this situation, the power factor is low, and in order to have a high output power on the arc it is necessary to draw a high RMS current value from the mains.

The high RMS factor and the high harmonic content of the absorbed current are a severe problem, particularly when power supply lines are not sized for this kind of load.

This occurs in particular when using welders in domestic environments, where the systems are sized for modest consumptions.

In this case the lines become dangerously warm and it is therefore necessary to limit the power delivered by the generator of the welder, with all the related consequences for the arc and for the possibility to perform welding.

If one did not proceed in this manner, the high intensity of the RMS current absorbed by the generator would cause the tripping of the safety thermal cutout of the system even though the useful power in output is lower than that of an equivalent resistive load.

A generator with this electrical diagram is also sensitive to variations in the input power supply voltage, particularly when the voltage decreases.

In this case, there is a marked decrease in the performance of the generator and therefore of the welder.

In view of these problems, generators for welders with additional stages have been developed so that they absorb on the power supply side a current that is as sinusoidal as possible.

In this manner, the generator is equivalent to a resistive load, and this allows to utilize all the available active power.

The additional stages also allow to adapt automatically the generator to the variation in mains voltage, thus ensuring the performance of the welder throughout its operating range.

A typical diagram with additional stages is shown, in its essential parts, in FIG. 3.

This diagram allows to notice, by comparing it with the diagram of FIG. 1, the addition of a stage 11, interposed between a rectifier block 12 and a leveling capacitor block 13.

Such additional stage 11 is known technically as a BOOST-type PFC and comprises an inductor 14, an electronic switch 15, and a diode 16, arranged as in FIG. 3.

The block 11, by means of an appropriate device 17 for controlling the switch 15, in addition to making the input current absorption practically sinusoidal as shown in FIG. 4, allows to keep constant the value of the voltage and the terminals of the leveling capacitor block 13 as the input voltage varies.

This also allows to optimize the size of the electronic power switches used in inverter block 18.

Another known generator is the one shown schematically in FIGS. 5, 6 and 7.

In this case there is a single input rectifier stage 21, capable of ensuring both sinusoidal absorption from the mains and automatic adaptation to input voltage fluctuations.

The input stage 21 is shown in greater detail in FIG. 6 in the case of a single-phase power supply and in FIG. 7 in the case of a three-phase power supply.

These circuits are illustrated in greater detail in WO 01/03874 by the same Applicant.

In this case, the generator is composed of a set of blocks that are designated, in FIG. 5, as an input rectifier stage 21, a level stage 22 with capacitors, an inverter stage 23 with electronic switches, a current transformer 24, and a power supply stage 25 for the welding arc 26.

The most important part of the generator is located in the input rectifier stage 21, shown in detail in FIGS. 6 and 7.

FIG. 6 shows a first detail of the input stage 21 related to a single-phase power supply generator.

In this circuit configuration, there is an inductor 27 that is directly connected to the mains input 28.

This inductor is followed by two diodes 29 and 30, which are mutually connected in opposition, each one being served by an electronic switch, designated by the reference numerals 31 and 32 respectively.

The outputs 33 and 34 supply the stage of the leveling capacitors 22.

In the case of a three-phase power supply, as shown in FIG. 7, there are three inductors, one for each phase, designated by the reference numerals 35, 36 and 37, which are directly connected to the mains 38.

Each one of the inductors is followed by a respective diode 39, 40 and 41, each of which is served by an electronic switch, designated by the reference numerals 42, 43 and 44 respectively.

This configuration allows to increase the overall efficiency of the system, since the power components used are reduced.

The problem of all known devices of the illustrated type is that two stages are always used in combination, i.e., a first input adaptation stage (PFC) and a second conversion stage that provides the welding inverter.

Moreover, there are two electronic control circuits dedicated respectively to the input adaptation stage (PFC) and to the inverter stage.

DISCLOSURE OF THE INVENTION

The aim of the present invention is to reduce the number of components used and therefore the cost of the generator.

A consequent object of the present invention is to provide a single stage capable of integrating and performing both the functions of the PFC stage and the functions of the inverter stage.

A further object is to reduce the number of power components used.

A still further object is to reduce the number of control components used.

Another object is to improve the efficiency of the generator with respect to known generators.

Another object is to reduce the cost of the generator with respect to others having comparable characteristics.

This aim and these and other objects that will become better apparent hereinafter are achieved by a generator for unitary power factor arc welders, of the type that comprises a current transformer that supplies, at a secondary winding thereof, a welding arc and is in turn supplied, at a primary winding thereof, by an input leveling and rectifying unit, characterized in that between said rectifier unit and said transformer there is an interposed electronic circuit with two electronic switches that provide a half-bridge structure that performs DC/DC conversion by way of the combination of the transformer and of a rectifier stage connected to the secondary winding of said transformer, and a leveling inductor, said circuit having the combination of resonant capacitive and inductive components arranged on the side of the primary winding of the transformer, said components charging the bank of capacitors arranged downstream of the electronic switches, furthermore keeping the voltage across it constant, means being also provided which are suitable to control the welding current and to ensure sinusoidal-type absorption from the mains.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

WAYS OF CARRYING OUT THE INVENTION

Figure 1:
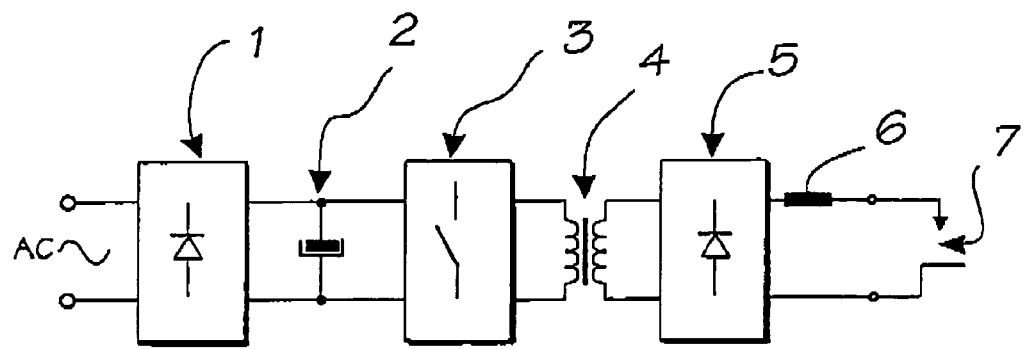
FIGS. 1–7 illustrate block diagrams and charts of conventional generators, previously discussed.
Figure 2:
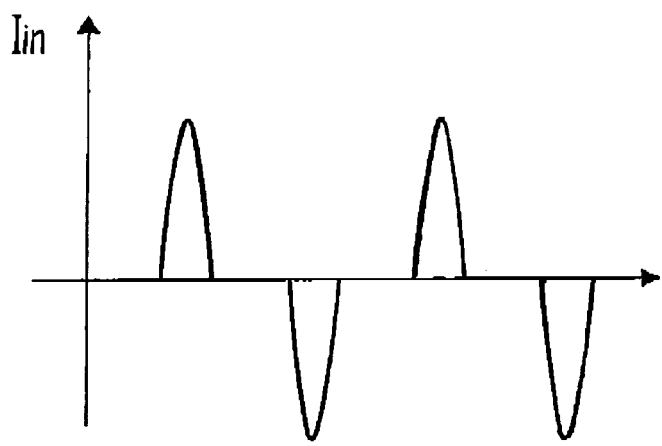
Figure 3:
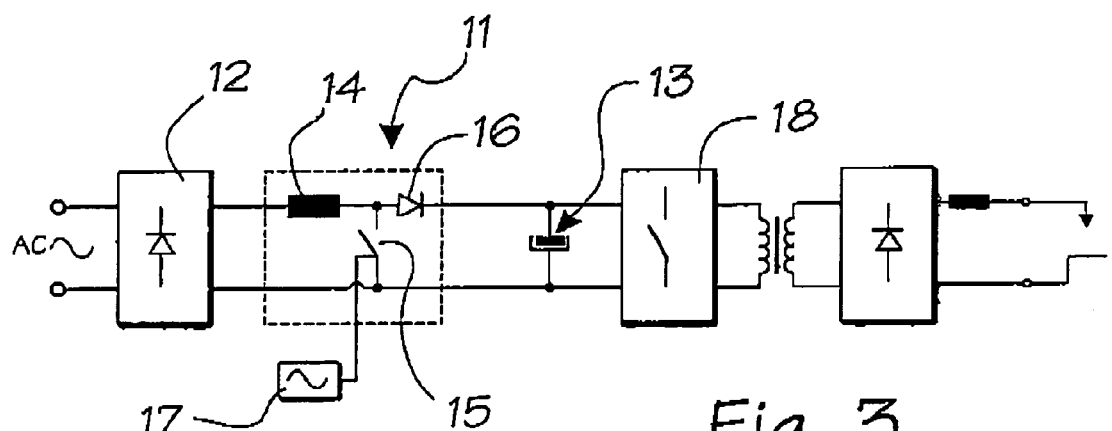
Figure 4:
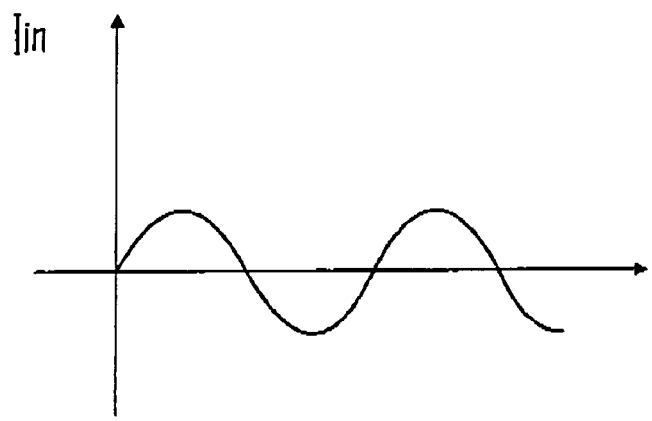
Figure 5:
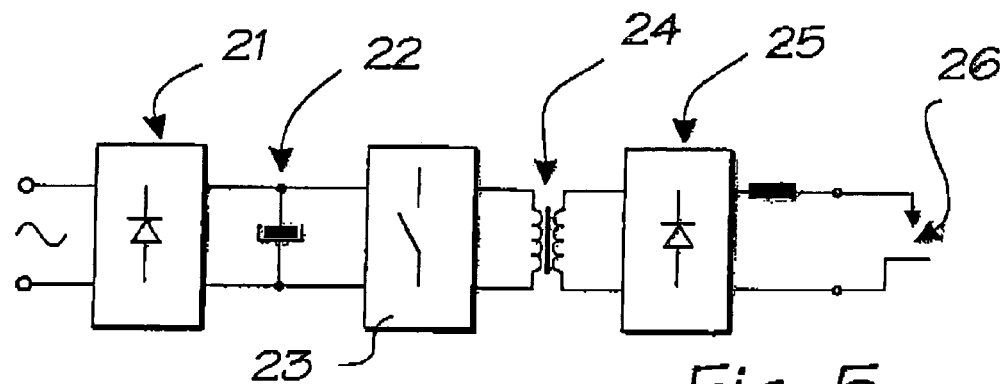
Figure 6:
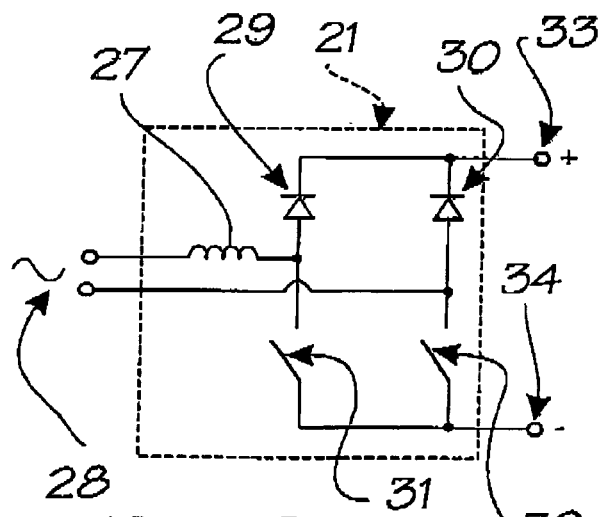
Figure 7:
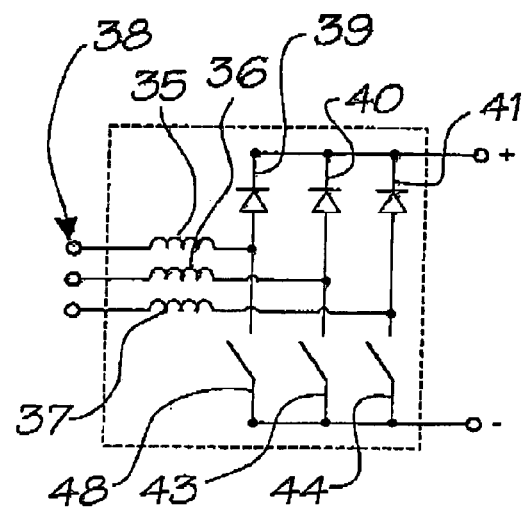
Figure 8:
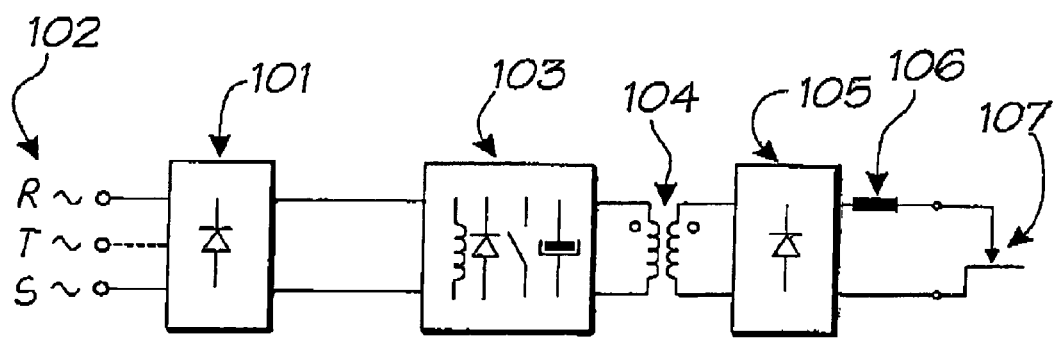
FIG. 8 is a typical diagram of a circuit according to the invention for a single-phase power supply generator.

With reference to FIGS. 8–11, the block diagram of the present invention is shown in FIG. 8 and is composed of an input rectifier stage 101, which is connected to power supply mains 102, can be of the single-phase or three-phase type (the latter being shown in dashed lines), and supplies a DC/DC converter stage with automatic PFC 103, which in turn supplies a power transformer 104, on the secondary winding of which there is a secondary rectifier stage 105 which, by interposing an output leveling inductor 106, supplies a welding arc 107.

Figure 9:
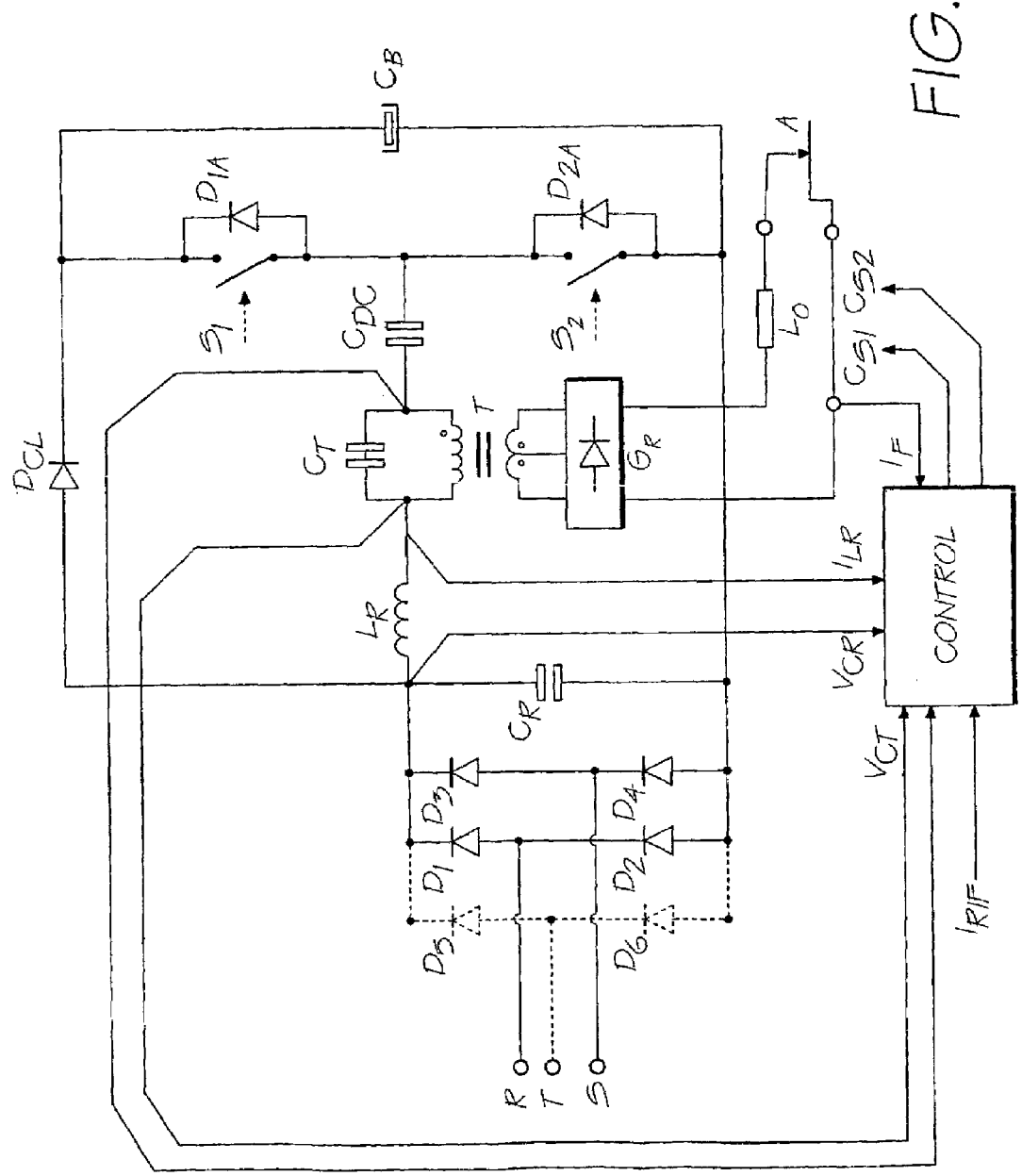
FIG. 9 is a detailed view of the circuit of FIG. 8.

The block diagram of FIG. 8 is shown more explicitly in FIG. 9.

As clearly shown, the power supply mains reaches the terminals R and S, if the mains is single-phase, and also the terminal T, if it is three-phase, and supplies an input rectifier stage constituted by four diodes $D_1$, $D_2$, $D_3$, $D_4$, if the power supply is single-phase, and by two more diodes $D_5$ and $D_6$ if the power supply is three-phase.

The rectifier stage supplies, by means of a diode $D_{CL}$, a bank of capacitors $C_B$ in which the energy is stored.

Two fast electronic switches $S_1$ and $S_2$ are arranged in series to each other and in parallel to the bank of capacitors $C_B$ in order to complete a power inverter circuit, each having its own free circulation diode for the current of the inverter circuit designated by $D_{1A}$ for $S_1$ and $D_{2A}$ for $S_2$.

On the output of the input rectifier stage there is a capacitor $C_R$ which, in combination with a series inductor $L_R$, is connected to the first terminal of the primary winding of a power transformer T.

In parallel to the primary winding of the power transformer T there is a connected capacitor $C_T$ which, together with the inductor $L_R$ and the capacitor $C_R$, provides a resonant circuit.

A secondary rectifier unit $G_R$ is present at the secondary winding of the power transformer T and supplies the welding arc A by means of an output leveling inductor $L_O$.

Between the second terminal of the primary winding of the transformer T and the center of the series of electronic switches $S_1$ and $S_2$ there is a capacitor $C_{DC}$ for blocking the DC component for series resonance.

The electronic switches $S_1$ and $S_2$ provide a half-bridge structure that, in addition to performing DC/DC conversion, by means of the power transformer T, the secondary rectifier stage $G_R$ and the leveling inductor $L_O$, integrates the PFC function, which is performed by means of the resonant components $C_T$, $L_R$ and $C_R$, which across the diode $D_{CL}$ charge the bank of capacitors $C_B$, furthermore keeping constant the voltage across it as the input voltage varies.

There is a control circuit for the fast switches $S_1$ and $S_2$ that allows to control the welding current and at the same time ensure sinusoidal-type absorption from the mains.

In FIG. 9, the control circuit is constituted by a CONTROL block, which processes a signal $V_{CT}$ that is proportional to the value of the voltage across the capacitor $C_T$, a signal $V_{CR}$ that is proportional to the value of the voltage across the capacitor $C_R$, a signal $I_{LR}$ that is proportional to the value of the current that circulates in the inductor $L_R$, a signal $I_{RIF}$ constituted by the reference value for the output current and a signal $I_F$ that is proportional to the value of the current on the welding arc A used by feedback in current control.

The processing of these data allows to drive the two switches $S_1$ and $S_2$.

Figure 10:
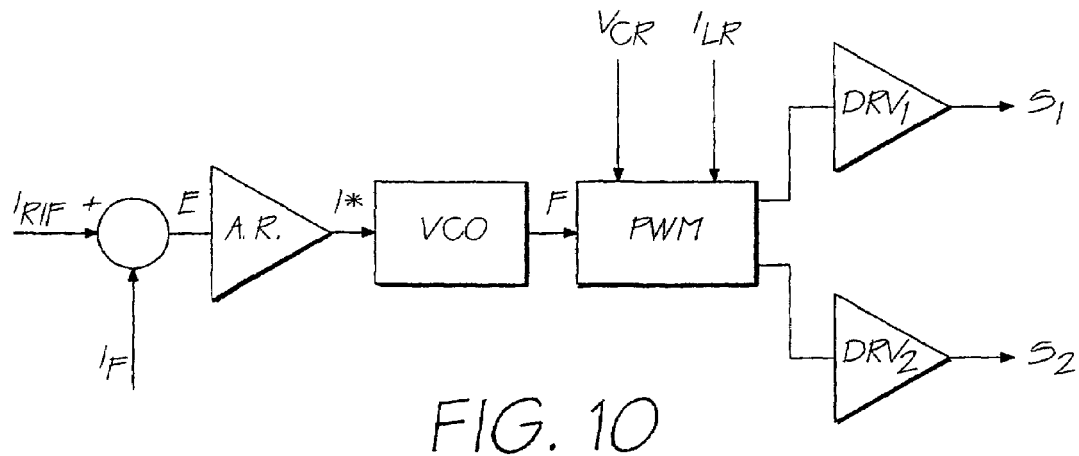
FIG. 10 is an example of electronic switch control block.
Figure 11:
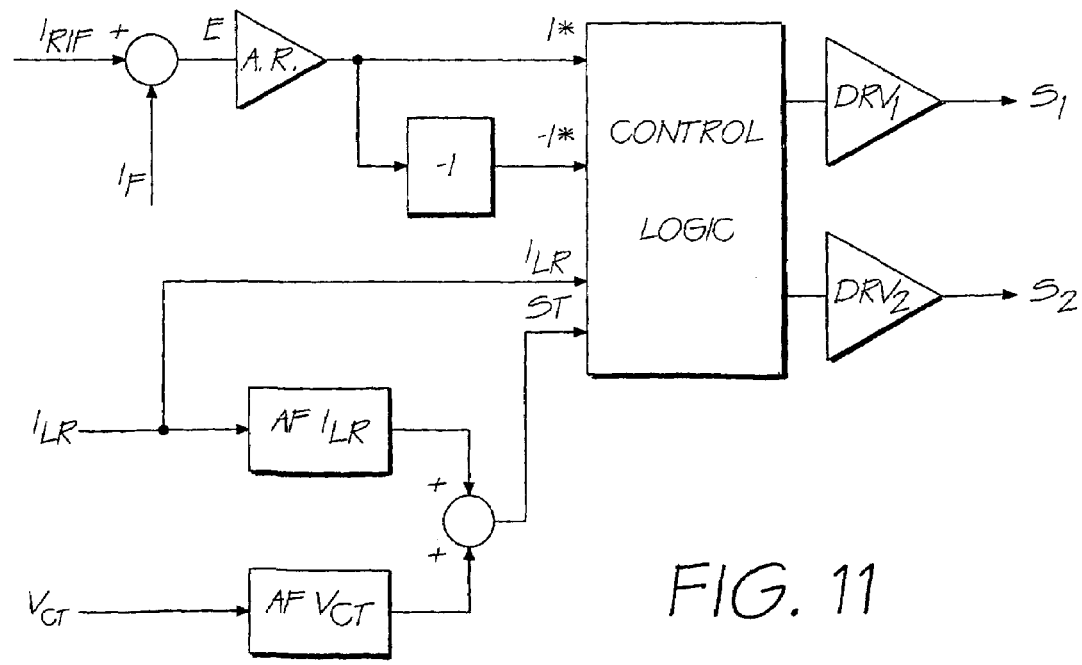
FIG. 11 is a view of a different embodiment of the electronic switch control block of FIG. 10.

Two kinds of these control circuits are shown in FIGS. 10 and 11.

FIG. 10 shows a control circuit in so-called frequency-control mode.

This circuit compares the reference value $I_{RIF}$ for the output current set by the user with the signal $I_F$, which is proportional to the value of the output current that flows in the load, used for feedback in current control, obtaining an error signal E that is $I_{RIF}$ minus $I_F$.

The error signal E is processed by a regulator amplifier AR, which generates a signal I*.

The signal I* enters a voltage-controlled oscillator block VCO, which varies its oscillation frequency and accordingly varies the switching frequency on the switches $S_1$ and $S_2$ as the value of I* varies.

The output of the block VCO is a signal F, which is the switching frequency that drives a pulse width modulator block PWM.

The modulator PWM varies the duration of the control pulses on the basis of the signals F and $V_{CR}$, in order to return to zero the error signal or to bring the output current to the set value $I_{RIF}$.

The signal $I_{LR}$, also processed by the block PWM, is used to allow soft switching-mode switchings, i.e., without losses, in order to increase the efficiency of the converter.

The signals in output from the block PWM control the two circuits $DRV_1$ and $DRV_2$, which drive the switches $S_1$ and $S_2$.

FIG. 11 illustrates a control circuit that uses a path control mode.

In this circuit, the reference value $I_{RIF}$ for the output current and the value $I_F$ proportional to the value of the output current that flows in the load used for feedback in current control are compared.

This processing produces a signal E, which is the error signal for current control and the difference between the reference value and the feedback value.

This signal is processed by an amplifier regulator AR, which generates a signal I* starting from the error signal E.

These signals enter a control logic, designated by the CONTROL LOGIC block, which supervises the switching of the switches.

The control logic processes the signals I* and –I* and a signal ST, which is a path signal that derives from the processing of a signal $I_{LR}$ that is proportional to the value of the current that flows in $L_R$ and a signal $V_{CT}$ that is proportional to the value of the voltage across $C_T$, these signals being processed by a filter amplifier for the current $I_{LR}$, designated by AF $I_{LR}$, and by a filter amplifier for the voltage $V_{CT}$, designated by AF $V_{CT}$; the signals in output from these blocks are added and determine the value of ST.

The control logic, starting from these signals I*,–I* and ST, decides the switching frequency of the electronic switches and the duration of the pulses applied thereto in order to return to zero the error signal or bring the output current to the value set by means of $I_{RIF}$.

The signal $I_{LR}$ is used to allow switchings in soft-switching mode, i.e. without losses, in order to increase the efficiency of the converter.

The CONTROL LOGIC block drives two circuits, respectively designated by $DRV_1$ and $DRV_2$, which in turn control the switches $S_1$ and $S_2$.

It is evident from the above description and from the illustrations that the circuit according to the invention, by integrating the functions in the switches, reduces the number of power components used with respect to previously known solutions, thus allowing to increase considerably the efficiency of the generator, which is now due to a single stage and is therefore greater than the efficiency obtainable from multiple cascade stages.

Furthermore, there is a single control and therefore the circuits related to control of the PFC stage have been eliminated.

By utilizing the series resonance of the components $C_T$, $L_R$ and $C_R$, one obtains a switching of the soft-switching type that allows a further increase in the efficiency of the generator.

All of the above leads to the conclusion that the intended aim and objects have been achieved; in particular, a generator for arc welding has been provided which is capable of absorbing a practically sinusoidal current from the AC power supply mains and is capable of adapting automatically to input voltage variations without loss of performance, integrating both functions in a single stage.

Clearly, the components of the circuit may be selected without thereby limiting the scope of the invention.

The disclosures in Italian Patent Application No. PD2001A000182 from which this application claims priority are incorporated herein by reference.

What is claimed is:

1. A generator for unitary power factor arc welders, of the type comprising a current transformer that supplies, at a secondary winding thereof, a welding arc and is in turn supplied, at a primary winding thereof by an input leveling and rectifying unit, wherein between said rectifier unit and said transformer there is an interposed an electronic circuit with two electronic switches that provide a half-bridge structure that performs DC/DC conversion by way of the combination of the transformer and of a rectifier stage connected to the secondary winding of said transformer, and a leveling inductor, said circuit having a combination of resonant capacitive and inductive components arranged on the side of the primary winding of the transformer, said components charging a bank of capacitors parallel-connected to the electronic switches, furthermore keeping the voltage across it constant, means being also provided to control the welding current and to ensure sinusoidal-type absorption from the mains, the generator further comprising resonant circuit composed of a capacitor $C_R$ that is supplied by the input rectifier unit an inductor $L_R$ in series between the capacitor $C_R$ and the first terminal of the primary winding of the Dower transformer T, and a capacitor $C_T$ that is in parallel on the primary winding of the transformer T and wherein said control means use and process the voltage across the capacitor $C_R$, the voltage across the capacitor $C_T$, the current in the inductor $L_R$, the set reference current $I_{RIF}$ and the welding current $I_F$, generating a switching frequency that drives the two electronic switches $S_1$ and $S_2$.

2. The generator according to claim 1, wherein the primary rectifier unit, by means of a diode $D_{CL}$, supplies a bank of capacitors $C_B$, across which there are, in a series configuration, two electronic switches $S_1$ and $S_2$ that provide a half-bridge structure for DC/DC conversion.

3. The generator according to claim 1, wherein said control means is composed of a block that determines the difference between a set current reference signal $I_{RIF}$ and a signal that is proportional to a current $I_F$ on the arc, a resulting signal being an error signal E, which by being processed by an amplifier regulator AR and by a voltage-controlled oscillator block generates a variable-frequency signal, which by being processed by a pulse width modulator determines frequency and duration of a control pulse on said switches $S_1$ and $S_2$.

4. The generator according to claim 1, wherein said control means is composed of a block that generates an error signal with a difference between a set reference current $I_{RIF}$ and an arc current $I_F$, said signal, together with a signal determined by the processing of a signal that is proportional to a current that flows in the inductor $L_R$ and of a signal that is proportional to the value of the voltage across the capacitor $C_R$, generates a "path" signal, said signals being processed by a control logic that determines frequency and duration of the switching of the electronic switches $S_1$ and $S_2$.

* * * * *